United States Patent

Van Der Houwen

[15] 3,651,265

[45] Mar. 21, 1972

[54] BIPOLAR REPEATER

[72] Inventor: Derk Van Der Houwen, Leidschendam, Netherlands

[73] Assignee: De Staat der Nederiander, Ten Deze Vertegenwoordiga Door de Directeur-Generaal der Posterijen, The Hague, Netherlands

[22] Filed: Apr. 30, 1970

[21] Appl. No.: 33,182

[30] Foreign Application Priority Data

June 5, 1969 Netherlands..........................6906935

[52] U.S. Cl. ..........................................................178/70 R
[51] Int. Cl. ..........................................................H04l 25/52
[58] Field of Search ...............................................178/70 R

[56] References Cited

UNITED STATES PATENTS 3,144,605 8/1964 Reidel..................................178/70 R
3,370,238 2/1968 Lampa..................................178/70 R

*Primary Examiner*—Kathleen H. Claffy
*Assistant Examiner*—William A. Helvestine
*Attorney*—Hugh Adam Kirk

[57] ABSTRACT

The invention relates to a bipolar repeater to be used in any system in which the transmission of information takes place by means of pulses in bipolar or pseudo-ternary form. The sensitivity of such a repeater to disturbances in limited to a value characteristic of a binary repeater. An input filter converts the distorted bipolar signal received from the transmission path into a binary signal. A binary regenerator provided with feedback and having two output terminals makes good the low-frequency shortage of this signal. An output circuit restores the signal to the bipolar form. This circuit has two AND-gates, one of which combines the first regenerator output, delayed by one bit in a delay circuit, with the second, the other combining bit in second regenerator output, delayed by one bitin the delay circuit, with the first. The output terminals of the two gates are connected to the primary side of the output transformer.

18 Claims, 2 Drawing Figures

INVENTOR.
DERK VAN DER HOUWEN
BY Hugh A. Kirk
ATTORNEY

BIPOLAR REPEATER

SUMMARY OF THE INVENTION

The invention relates to a bipolar repeater. Such a bipolar repeater is known from the *Bell System Technical Journal* 41 (1962), pp. 25–97. A transmission path may present disturbances exceeding the two decision thresholds of the repeater. It can be seen that in such a pseudo-ternary system higher requirements must be set as regards the quality of a signal pulse received, judged by shape and amplitude, than in a binary system having only one decision threshold.

Now the invention provides a bipolar repeater comprising means for limiting the disturbance sensitivity to a value characteristic of a binary repeater.

According to the invention the means comprise an input filter, a binary regenerator and an output circuit. The input filter converts a bipolar signal shape distorted on a transmission path, apart from a low-frequency shortage, into a binary signal shape. The binary regenerator is provided with feedback for making good the low-frequency shortage. The output circuit is connected to both regular and inverted signals from the output terminals of the binary regenerator with the regular signal passing through a delay circuit to a first AND-gate for combination with the inverted signal, and the regular signal passing to a second AND-gate for combination with the delayed inverted signal, said delay circuit delaying bits supplied by the binary repeater by no more than one bit period. The output terminals of the first and second AND-gates are connected together through the primary winding of an output transformer.

It is to be observed that a binary regenerator provided with feedback for making good a low-frequency shortage is known from the journal of the Netherlands Post, Telegraph and Telephone Department's ideas, methods and research entitled "Het P T T - bedrijf" 16 (1969), p. 85–87.

The invention renders the insight that with simple means such a binary regenerator can be made compatible with a bipolar, pseudo-ternary transmission system. It is an advantage that a smaller number of regenerative repeaters according to the invention is required for bridging a transmission traject than would be the case with known bipolar repeaters.

BRIEF DESCRIPTION OF VIEWS

The above-mentioned and other features and objects of the invention and the manner of attaining them will become apparent and the invention itself will be understood best by reference to the following description of an embodiment of the invention taken in conjunction with the accompanying drawings, wherein.

DETAILED DESCRIPTION

Figure 1:
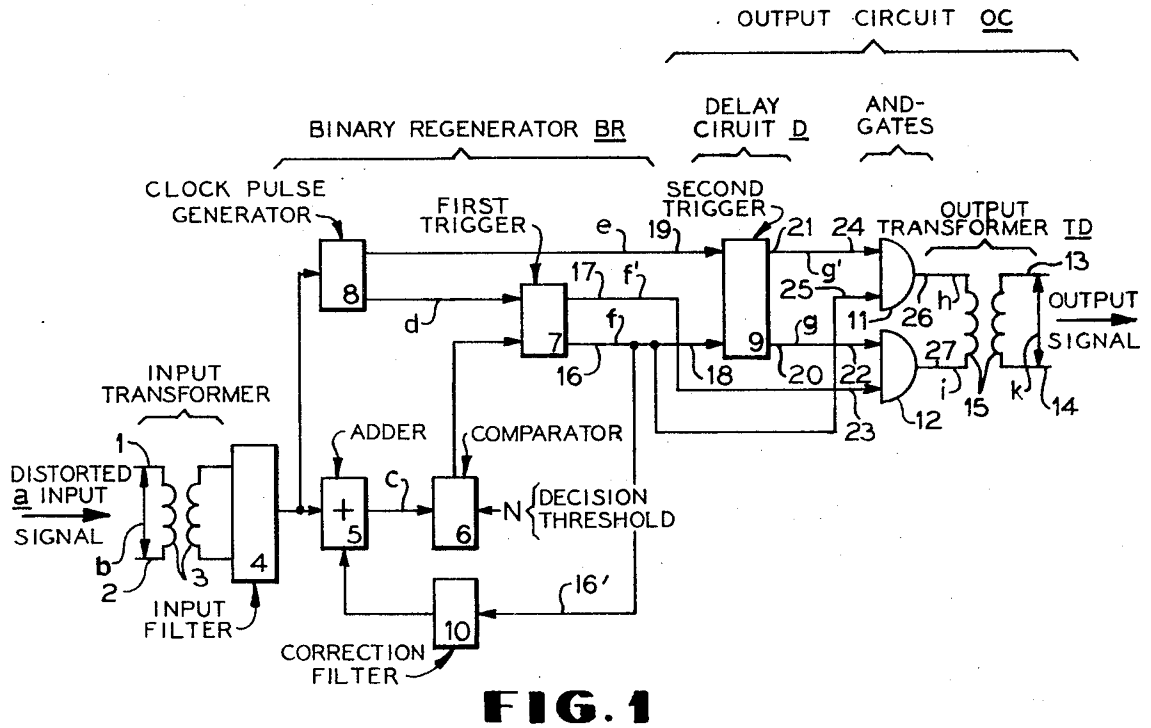
FIG. 1 is a schematic block wiring diagram of a preferred embodiment of a bipolar repeater according to this invention.

In FIG. 1 the input terminals 1 and 2 of the repeater device of this invention are connected to the primary winding of an input transformer 3. The secondary winding of this transformer forms the input circuit of an input filter 4.

An output terminal of the filter 4 is connected to a clock pulse circuit 8 and to an input terminal of an adder 5. A second input terminal of the adder is connected to an output terminal of a correction filter 10. An output terminal (*c*) of the adder leads to a first input terminal of a comparator 6, a second input terminal of which is connected to a decision threshold N. An output terminal of the comparator 6 is connected to an input terminal of a first trigger 7, which can be triggered by a first output terminal (*d*) of the clock pulse circuit 8. A second output terminal (*e*) of the clock pulse circuit 8 is connected to an input terminal 19 of a second trigger 9. One output terminal (*f*) 16 of the first trigger 7 is connected to an input terminal 16′ of the correction filter 10, to an input terminal 18 of the second trigger 9, and to an input terminal 25 of an AND-gate 11. The other output terminal (*f*′) 17 of the trigger 7 is connected to an input terminal 23 of another AND-gate 12. One output terminal 20 of the second trigger 9 is connected to another input terminal 22 of an AND-gate 12, while the other output terminal 21 of the second trigger 9 is connected to another input terminal 24 of the AND-gate 11. The output terminal 26 of the AND-gate 11 and the output terminal 27 of the AND-gate 12 are connected to opposite terminals or ends of the primary winding of an output transformer 15, the secondary winding of which ends in the output terminals 13 and 14 of the repeater of this invention.

Figure 2:
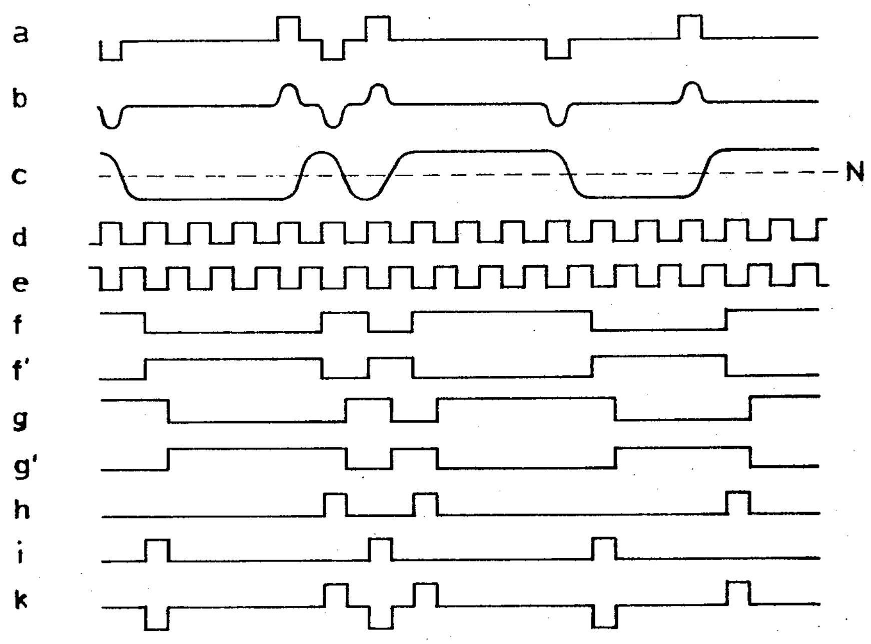
FIG. 2 is a plurality of wave forms of signals occurring at different points in the diagram shown in FIG. 1.

The operation of the repeater can be understood from the time diagram of FIG. 2. A distorted incoming signal *b* was applied by a preceding repeater to the transmission path in the shape *a* represented in FIG. 2. This transmission path is connected to the terminals 1 and 2. The output terminal of the adder 5 presents a signal *c*, which appears, regenerated to the shape *f*, at the output terminal 16 of trigger 7 of the binary regenerator BR. A feedback path leads from this output terminal via conductor 16′ and the correction filter 10 to the adder 5. This first trigger 7 of the binary regenerator BR is controlled by the rising edge of the signals *d* produced by the clock pulse circuit 8. In the comparator 6, the signal *c* is compared with the detection threshold N, as is shown in FIG. 2.

A signal shape *e* originating from the clock circuit 8 is passed to the second trigger 9 which constitutes a delay circuit D, so that the signal shape *g* appears at the output terminal 20 with a delay of no more than one bit period as compared with the signal shape *f*. The signal shapes given in FIG. 2 are based on the supposition of a 50 percent duty cycle. The AND-gate 11 forms from the signal shape *f* and the inverted form *g*′ of the signal shape *g*, a signal shape *h*. The AND-gate 12 forms from the signal shape *g* and the inverted form *f*′ of the signal shape *f* a signal shape *i*.

The output terminals 26 and 27 of the AND-gates 11 and 12 present, via the output transformer 15, at the output terminals 13 and 14, a signal shape *k* corresponding to the signal shape *a*, but delayed in time therefrom.

While there is described above the principles of this invention in connection with specific apparatus, it is to be clearly understood that this description is made only by way of example and not as a limitation to the scope of this invention.

I claim:

1. Bipolar repeater having means for limiting the disturbance sensitivity to a value characteristic of a binary repeater, characterized in that said means comprises: an input filter (4), a binary regenerator (BR) and an output circuit (OC) connected to a first output terminal (16, *f*) of the binary regenerator and to a second output terminal (17, *f*′) of said regenerator at which the output of the first appears inverted; said input filter being capable of converting a bipolar signal shape distorted on a transmission path into a binary signal shape (*c*), said binary regenerator being provided with feedback (16′), and said output circuit presenting the first output (*f*) through a delay circuit (9, D, *g*) to a first AND-gate (12) with the second output (*f*′) of said binary regenerator, and a second output (*g*′) from said delay circuit (D) being connected to a second AND-gate (11) with the first output (*f*) of said binary regenerator, said delay circuit delaying bits supplied by the binary regenerator by no more than one bit period, and an output terminal of the first AND-gate and an output terminal (26) of the second AND-gate being connected together via the primary winding (15) of an output transformer (TO).

2. A repeater for a bipolar type signal comprising:

A. means (4) for converting a distorted bipolar type signal (*b*) into a binary signal (*c*);

B. a binary regenerator (BR) for reshaping said binary signal to regenerate the low frequency shortage; and C. an output circuit (OC) for regenerating the bipolar signal from said reshaped binary signal.

3. A repeater according to claim 2 wherein said converting means comprises an input filter.

4. A repeater according to claim 3 wherein said binary regenerator comprises a feedback circuit (16') and a clock pulse generator (8).

5. A repeater according to claim 2 wherein said binary regenerator comprises:

a. an adder (5), b. a comparator (6) connected to said adder with a precision threshold (N), c. a trigger circuit (7) connected to said comparator, and d. a feedback circuit (16') from said trigger circuit to said adder.

6. A repeater according to claim 5 wherein said feedback circuit includes a correction filter (10).

7. A repeater according to claim 6 wherein said trigger circuit has two outputs (16, 17), one of which outputs is connected to said correction filter.

8. A repeater according to claim 5 including a clock pulse generator (8) for controlling said trigger circuit.

9. A repeater according to claim 2 wherein said output circuit comprises means (D) for delaying the reshaped binary signal and means (11, 12, 15) for combining said reshaped binary signal and the delayed reshaped binary signal.

10. An output circuit according to claim 9 wherein said delaying means comprises a trigger circuit (9).

11. A repeater according to claim 10 wherein said trigger circuit has two outputs (20, 21), one being of opposite polarity to that of the other.

12. A repeater according to claim 11 wherein said combining means comprises a pair of gate means (11, 12).

13. A repeater according to claim 12 wherein one of said gate means (11) combines the reshaped (*f*) and the inverted delayed reshaped (*g'*) binary signals, and the other gate means (12) combines the inverted reshaped (*f'*) and the delayed reshaped (*g*) binary signals.

14. A repeater according to claim 9 wherein said combining means includes the primary winding of an output transformer (15).

15. A repeater for a bipolar type signal comprising:

A. an input filter (4) for converting distorted bipolar type signals into binary signals;

B. a binary regenerator (BR) for reshaping said binary signals to make good their low-frequency shortage comprising:

a. an adder (5), b. a comparator (6) connected to said adder, c. a first trigger circuit (7) connected to said comparator having two outputs (16, 17), one being of opposite polarity to the other, d. a correction filter (10) connected in a feedback circuit (16') from one of said outputs of the first trigger circuit to said adder, and e. a clock pulse generator (8) for controlling (d) said trigger circuit; and

C. an output circuit (OC) for regenerating the bipolar signals from said reshaped binary signals comprising:

a. a second trigger circuit (9) having two outputs (20, 21), one being of opposite polarity to the other, for delaying said reshaped binary signals, and b. a pair of gate means (11, 12) for combining said reshaped and delayed binary signals.

16. A repeater according to claim 15 wherein said clock pulse generator also controls (*e*) said second trigger circuit.

17. A repeater according to claim 15 wherein one of said gate means (11) combines the reshaped (*f*) and inverted delayed reshaped (*g'*) binary signals from said first and second trigger circuits, and the other of said gate means (12) combines the inverted reshaped (*f'*) and delayed reshaped (*g*) binary signals from said first and second trigger circuits.

18. A repeater according to claim 17 wherein said output circuit includes the primary winding of an output transformer (15) for combining the output of said two gate means.

* * * * *

UNITED STATES PATENT OFFICE
CERTIFICATE OF CORRECTION

Patent No. 3,651,265 Dated March 21, 1972

Inventor(s) Derk Van Der Houwen

It is certified that error appears in the above-identified patent and that said Letters Patent are hereby corrected as shown below:

On the cover sheet, item [30] "June 5" should read -- May 6 -- ; item [57] in the ABSTRACT, line 4, "in" should read -- is -- ; line 13, "bit in" should read -- the -- and "bitin" should read -- bit in -- . Column 2, line 13, "operation" should read -- working -- ; and "understood" should read -- read -- .

Signed and sealed this 14th day of November 1972.

(SEAL)
Attest:

EDWARD M.FLETCHER,JR.
Attesting Officer

ROBERT GOTTSCHALK
Commissioner of Patents